United States Patent
Beausoleil et al.

(10) Patent No.: US 7,428,562 B2
(45) Date of Patent: Sep. 23, 2008

(54) SELF-AUTHENTICATING QUANTUM RANDOM NUMBER GENERATOR

(75) Inventors: Raymond G. Beausoleil, Redmond, WA (US); William J. Munro, Bristol (GB); Timothy P. Spiller, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 837 days.

(21) Appl. No.: 10/998,208

(22) Filed: Nov. 26, 2004

(65) Prior Publication Data

US 2006/0115086 A1    Jun. 1, 2006

(51) Int. Cl.
G06F 7/58    (2006.01)

(52) U.S. Cl. .................................................. 708/255
(58) Field of Classification Search ............... 708/255
See application file for complete search history.

(56) References Cited

U.S. PATENT DOCUMENTS

| | | | |
|---|---|---|---|
| 6,609,139 B1 * | 8/2003 | Dultz et al. ............... 708/250 |
| 2005/0095003 A1 * | 5/2005 | Huberman et al. ........... 398/140 |
| 2005/0135620 A1 * | 6/2005 | Kastella et al. ............. 380/256 |
| 2006/0010182 A1 * | 1/2006 | Altepeter et al. ............ 708/250 |
| 2006/0120529 A1 * | 6/2006 | Gisin et al. ................. 380/256 |

OTHER PUBLICATIONS

Benson, Oliver et al., "Regulated and Entangled Photons from a Single Quantum Dot," Physical Review Letters, 84:11:2513-2516 (2000).
Fiorentino, Marco, "Generation of Ultrabright Tunable Polarization Entanglement WIthout Spatial, Spectral, or Temporal Constraints," Physical Review A 69 041801-1-4 (2004).
Konig, Friedrich et al., "Efficient and Spectrally Bright Source of Polarization-entangled Photons" Quantum Physics 0409162:1-8 (2004).
Kwiat, Paul G.et al., "Ultrabright Source of Polarization-entangled Photons" Physical Review A, 60:2:R773-R776 (1999).
Li, Xiaoying et al., "All-fiber Photon-pair Source for Quantum Communications: Improved Generation of Correlated Photons" Optics Express 12: 16: 3737-3744 (2004).

(Continued)

*Primary Examiner*—David H Malzahn

(57) ABSTRACT

A quantum random number generator uses measurements of a quantum state to generate a random value and to authenticate that the quantum state had the required properties for generation of a random series having the desired statistics. One exemplary embodiment generates an entangled photon pair in the singlet Bell state, measures one photon to extract a random value, and measures the other photon for confirmation that the photon pair were in the singlet Bell state. Another embodiment of the invention performs tomographic analysis of a state used for random number generation to confirm that the state used had the desired properties.

36 Claims, 3 Drawing Sheets

OTHER PUBLICATIONS

Li, Xiaoying Li et al., "Optical-fiber Source of Polarization-entangled Photon Pairs in the 1550 nm Telecom Band" Quantum Physics 0402191: 1-11 (2004).

Munro, W.J. et al., "Tomography And Its Role in Quantum Computation" HP Technical Reports, HPL-2001-53, pp. 1-4 (Mar. 19, 2001).

Tanzilli, S. et al., "Highly Efficient Photon-pair Source Using Periodically Poled Lithium Niobate Waveguide" Electronic Letters 37:1:1-2 (2001).

Thew, R.T. et al., "Mixed State Entanglement: Manipulating Polarization-entangled Photons" Physical Review A, 64:022320-1 -11 (2001).

White, Andrew G. et al., "Nonmaximally Entangled States: Production, Characterization, and Utilization" Physical Review Letters 83:16:3103-3107 (1999).

White, A.G. et al., "Exploring Hilbert Space: Accurate Characterization of Quantum Information" Physical Review A, 65:012301-1-4 (2001).

* cited by examiner

SELF-AUTHENTICATING QUANTUM RANDOM NUMBER GENERATOR

BACKGROUND

Information processing systems use random number generators in executing a variety of tasks such as numeric integration, data and systems simulations, communications, and random sampling. Random number generators are also key components of secure systems such as trusted computing modules. Random number generators for such systems ideally generate a series of values (e.g., bits) such that prediction of a specific value in the series is impossible. However, the random series can generally be characterized statistically. For example, a random series of bits may be characterized as containing a specific percentage (e.g., 50%) of bits with value "0" even though predicting that a specific bit has value "0" is not possible.

Conventional random number generators that are implemented in software typically use numeric techniques to generate seemingly random series. Many of these techniques use the properties of prime numbers because no formula is known that identifies the prime number among the set of integers. However, these conventional random number generators produce pseudo random series since the formulas that generate the series allow prediction and reproduction of the series.

One type of hardware based random number generator is based on the complexity of thermal noise fluctuations that exhibit "chaotic" behavior. The difficulty of predicting a chaotic process is assimilated to randomness. A drawback of this type of random number generator is that tampering with or alteration of the environment of the generator can control or influence the thermal noise. Further, sufficiently powerful processing systems with appropriate models or algorithms may become able to predict thermal processes.

A quantum random number generator has been proposed that is based on measurement of a quantum state of a single photon having two possible paths. In particular, detectors in the possible paths will detect the photon in one path or the other, but a prediction of the path taken by the photon is theoretically impossible if the original state of the photon has non-zero probability amplitudes for both paths. A random series of bits can thus be generated by producing a series of identical single photon states, measuring each state to detect a path for each photon, and assigning a bit value "0" to detection of a photon in one path and a bit value "1" to detection of a photon in the other path. A problem with this quantum random number generator is that statistics, e.g., the percentages of ones and zeros, in the random series depend on the probability amplitudes of the original photon states. Accordingly, tampering with or errors in the preparation of the photon states used in generating the random series will produce a biased series, e.g., a series lacking the desired statistical properties.

SUMMARY

In accordance with an aspect of the invention, a random number generator uses measurements of quantum states to generate random values and also to authenticate that a resulting random series will have desired statistical properties. One specific authentication technique uses entangled states of two or more quantum systems so that measurement of one quantum system provides a random value and measurements of the other quantum systems provide confirmation or authentication that the correct initial state was used. Another authentication technique uses tomographic analysis of the quantum state used in random number generation to confirm or authenticate that the correct initial state was used.

BRIEF DESCRIPTION OF THE DRAWINGS

Use of the same reference symbols in different figures indicates similar or identical items.

DETAILED DESCRIPTION

A quantum random number generator in accordance with a selected embodiment of the invention uses measurements of quantum states to produce a sequence of bits with randomness stemming from quantum physics. The quantum random number generator produces true randomness (assuming that the current understanding of quantum mechanics is fundamentally correct), and the random series generated are therefore immune to predictions that might otherwise become possible with technological advances. The quantum random number generator can use an entangled quantum state to provide an avenue for authentication that the state had the desired form to produce a random series with desired statistical properties. Alternatively or additionally, tomographic analysis or other forms of entanglement or state testing/analysis can provide authentication that the desired quantum state was used. Such analysis can use measurements that are taken for random series generation and/or auxiliary measurements taken especially for analysis of the state used.

Figure 1:
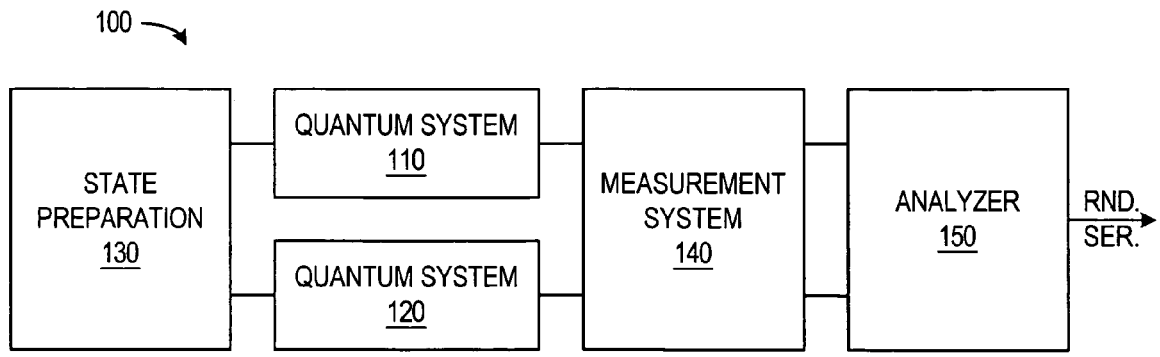
FIG. 1 shows a block diagram of a random number generator in accordance with an embodiment of the invention.

FIG. 1 shows a random number generator 100 in accordance with an embodiment of the invention. Random number generator 100 includes two quantum systems 110 and 120, a state preparation block 130 capable of placing systems 110 and 120 into a desired state, a measurement system 140 that measures systems 110 and 120, and an analyzer 150 that uses the measurements in selecting random values for output.

Each quantum system 110 or 120 can generally be any type of physical system that is suitable for representing a qubit, provided that a mechanism is available for setting systems 110 and 120 in the desired state. As described further below, the desired quantum state of systems 110 and 120 may be an entangled state or a state otherwise constructed to produce a random series having the desired statistical properties. Solid-state embodiments of quantum systems 110 and 120 may be implemented using solid-state devices containing qubits that can be prepared in some suitable entangled state. Examples of quantum systems representing a qubit in a solid-state structure include the spin or charge of an ion or atom in a semiconductor and a charge or flux in a superconductor. Ionic qubits held in microtraps, for example, can be controllably entangled through their mutual interaction with a quantum mode of vibrational motion. Atomic qubits trapped magnetically (or optically) can be entangled through controlled collisions or mutual interaction with a quantum electromagnetic field mode. Charge qubits in semiconductors can be entangled through direct capacitive (Coulomb) interactions and spin qubits in semiconductors can be entangled through their direct magnetic interactions or through state-dependent conditional creation of excitations that mediate an interaction. Charge qubits in superconductors can be entangled through direct capacitive (Coulomb) interactions or through their mutual interaction with a quantum electromagnetic field mode. Flux/current qubits in superconductors can be entangled through direct inductive (current-current) interactions or through their mutual interaction with a quantum electromagnetic field mode. In an embodiment of the invention described further below, systems 110 and 120 are photons and state preparation block 130 is a source that produces a pair of photons in the desired entangled state.

Measurement system 140 measures systems 110 and 120 and therefore can be implemented using sensors or detectors of types that depend on the implementation of quantum systems 110 and 120 and on the property of systems 110 and 120 used to distinguish qubit values. For the example systems named above, measurement system 140 may measure the qubit state of an ion or an atom through resonance fluorescence, the state of a charge qubit by coupling the charge to a quantum point contact (QPC) or single electron transistor (SET), the state of a spin qubit by conditionally converting the spin to a charge and then using a QPC or SET, the state of a flux/current qubit through a coupling to a SQUID magnetometer or Josephson-junction-based current detector, or a polarization state using optical devices. These and other systems for representing and measuring qubits are widely described in the literature and are well known to those of skill in the art.

A measurement of one quantum system 110 or 120 is generally sufficient to provide a random bit with a statistical probability of being 0 or 1 that depends on the prepared state. However, if the prepared state is known, the results of one or repeated measurements of systems 110 and 120 can be compared with the expectation values of the prepared state to confirm or authenticate that the measured states were indeed the prepared state. Additionally, the prepared state of systems 110 and 120 can be selected to be an entangled state that is such that the result from measuring system 110 dictates the result of a simultaneous measurement of system 120. Accordingly, preparing an appropriate entangled state permits use of the measurement of one system 110 or 120 for generation of a random value and use of the measurement of the other system 120 or 110 for confirmation or authentication that random number generator 100 used the appropriate quantum state for generation of a random series having the desired statistical properties.

In one embodiment of system 100, analyzer 150 uses one measurement result from measurement system 140 to identify a random value and uses one or more other measurement results to determine whether to use the random value. In particular, a random value extracted from one measurement may be discarded if the other measurement is inconsistent with the expected properties of the prepared state or alternatively used in the random series if the other measurements are consistent with expected properties of the prepared state. These functions of analyzer 150 can be implemented using conventional digital circuitry and/or software executed in a conventional computer.

Figure 2A:
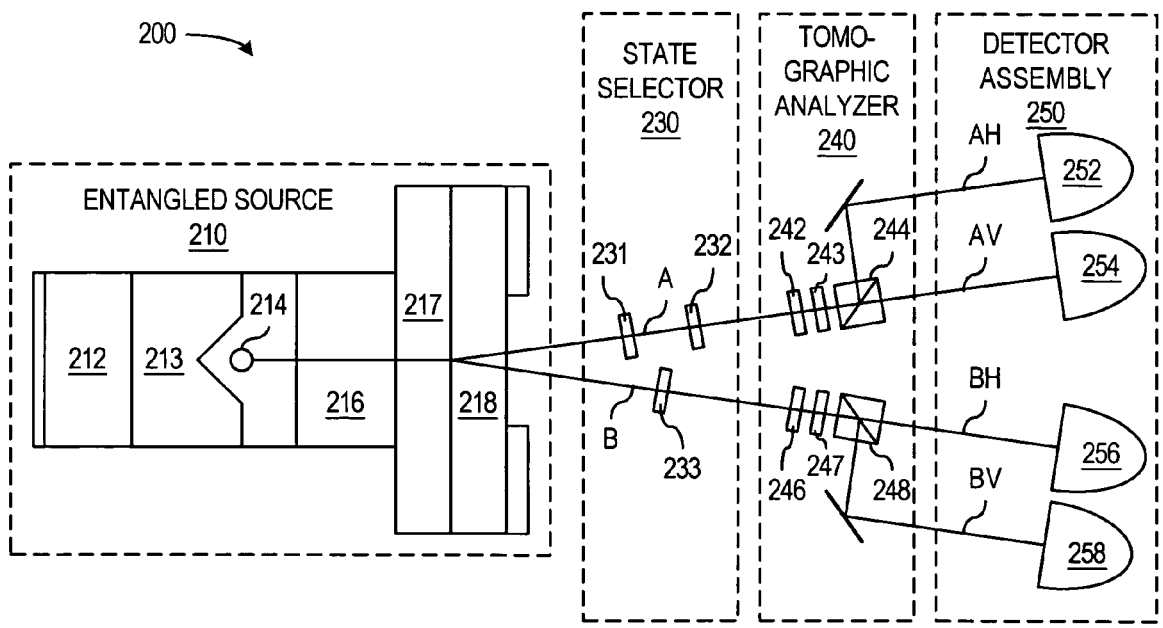
FIGS. 2A, 2B, and 2C are block diagrams of random number generators in accordance with alternative embodiments of the invention using entangled photon pairs for generation of random bits.

FIG. 2A shows a random number generator 200 in accordance with an exemplary embodiment of the invention using a source 210 of photon pairs and a state selector 230 to prepare copies of a photon state. Use of photon states is particularly desirable since photon states can maintain quantum coherence for quantum random number generation at room temperature. In general, the prepared state of a photon pair can be selected to provide desired statistical characteristics for the random series. However, in an exemplary embodiment of the invention, the prepared state of each photon pair from source 210 and selector 230 is a maximally entangled state. As an illustrative example, the following description will emphasize the case in which the prepared state is a singlet Bell state |φ>. Those skilled in the art that will recognize that any maximally entangled state can be made equivalent to the singlet Bell state with an appropriate selection of the bases for the qubits.

Equation 1 indicates the form of singlet Bell state |φ>, where states $|0>_i$ and $|1>_i$ for index i equal to A or B are the basis states for two qubits. In an exemplary embodiment of the invention described below, states $|0>_i$ and $|1>_i$ correspond to orthogonal linear polarization states $|H>_i$ and $|V>_i$ of the photon associated with qubit i. A key property of the singlet Bell state |φ> is that a measurement result identifying the state |1> for one qubit should always be accompanied by a measurement result identifying state |0> for the other qubit. Further, measurement of either qubit from the singlet Bell state |φ> has a 50% probability of producing a 0 or a 1.

$$\text{Equation 1:} \quad |\varphi\rangle = \frac{1}{\sqrt{2}}\{|0\rangle_A|1\rangle_B - |1\rangle_A|0\rangle_B\}$$

Source 210 can be any system capable of producing an entangled pair of photons that can be separated into output channels A and B for photons respectively corresponding to qubits A and B, and the output entangled state is not limited to the form of Equation 1. However, FIG. 2A shows a semiconductor implementation of source 210. In the illustrated semiconductor embodiment, source 210 includes a quantum dot 214 that separates a region 213 of a p-type semiconductor material (e.g., GaAs doped with p-type impurities) from a region 216 of an n-type semiconductor (e.g., GaAs doped with n-type impurities.) Quantum dot 214 and semiconductor regions 213 and 216 are sandwiched between Bragg mirrors 212 and 217. An applied current between semiconductor regions 213 and 216 causes electron-hole recombination causing quantum dot 214 to produce a maximally entangled photon pair. The Pauli exclusion principle prevents multiple electrons from simultaneous recombining with a hole at quantum dot 214, and thereby limits quantum dot 214 to production of one pair of photons at a time. Benson et al., Phys. Rev. Lett. 84, 2513 (2000) further describes this mechanism for photon pair production and indicates efficiency for pair production of up to 90%.

Figure 2B:
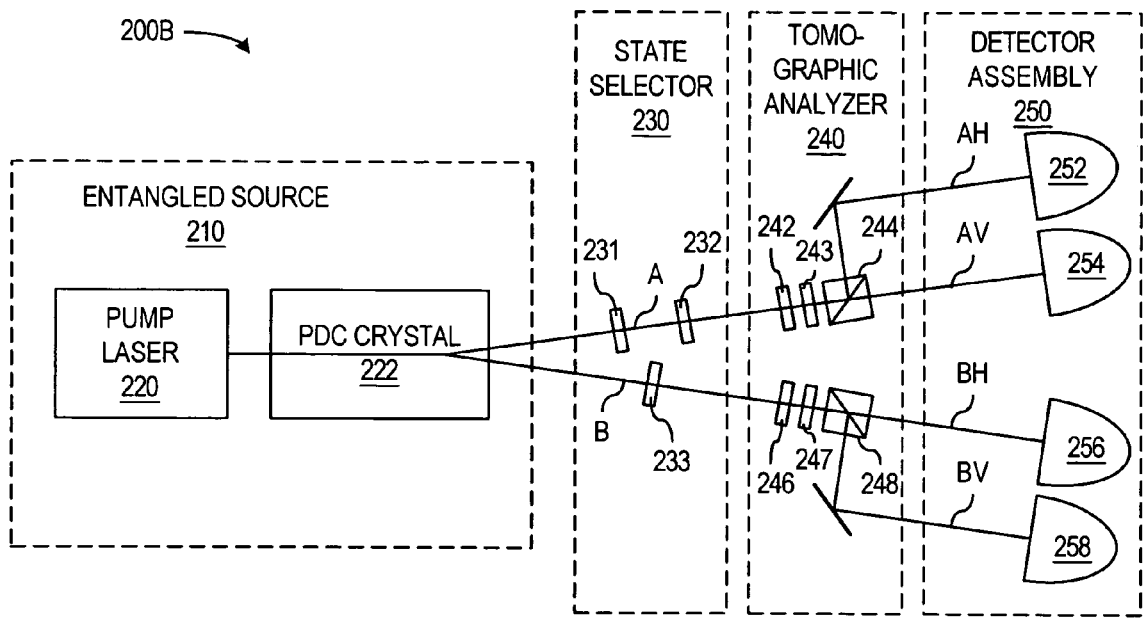

Source 210 can alternatively be implemented using parametric down conversion. FIG. 2B for example shows a random number generator 200 B in which source 210 contains a pump laser 220 as a source of single photons and a parametric down conversion (PDC) crystal 222. Fiorentino et al., "Generation of Ultrabright Tunable Polarization Entanglement Without Spatial, Spectral, Or Temporal Constraints," Physical Review A 69, 041801(R) (2004) describes one such source of polarization-entangled photons using parametric down conversion through a periodically-poled potassium titanyl phosphate (PPKTP) crystal 222, but periodically-poled lithium niobate (PPLN) could alternatively be used.

Figure 2C:
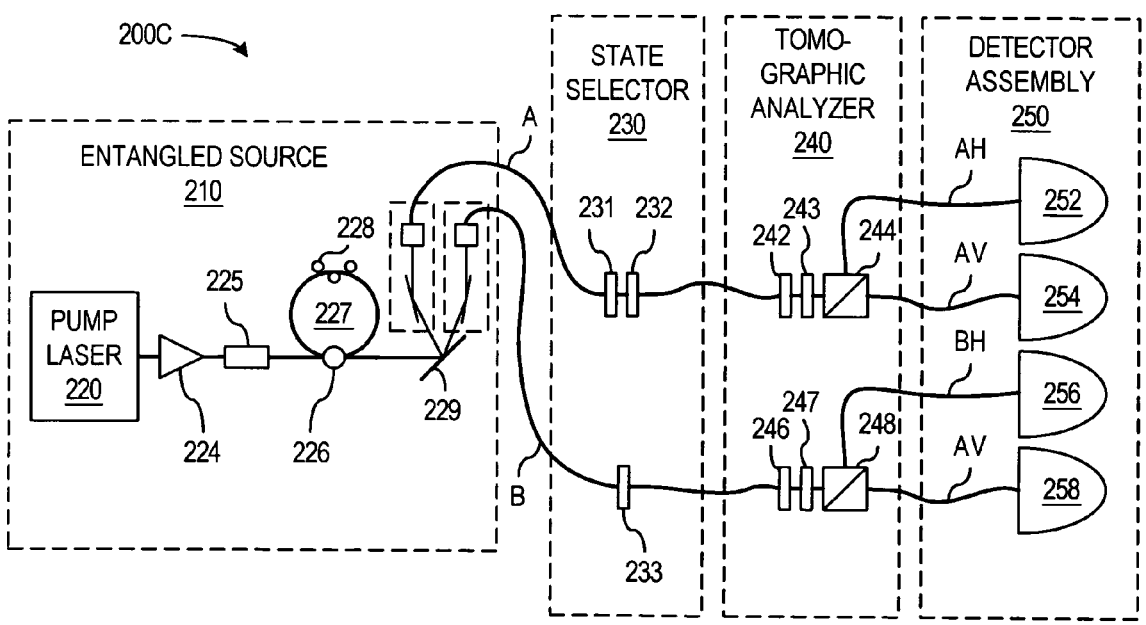

FIG. 2C illustrates another embodiment of source 210 in a random generator 200C using primarily fiber optic elements. In the embodiment of FIG. 2C, source 210 includes a pump laser 220, an erbium doped fiber amplifier (EDFA) 224, a frequency filter 225, a 50-50 beam splitter 226, a dispersion shifted fiber (DSF) loop 227, a filter polarization controller (FPC) 228, and a grating 229. Source 210 in random number generator 200C produces entangled photon pairs by directing photons with angular frequency o into DSF loop 227 where Raman scattering creates Stokes and anti-Stokes photons having respective angular frequencies $\omega_1$ and $\omega_2$ such that $2\omega=\omega_1+\omega_2$. Grating 229 can separate photons according to angular frequencies $\omega_1$ and $\omega_2$ for coupling into separate optical fibers corresponding to channels A and B. Li et al., "All-Fiber Photon-Pair Source For Quantum Communications: Improved Generation Of Correlated Photons," Optics Express, Vol. 12, No. 16, pp 3737-3744, (2004) further describe a suitable fiber optic source of entangled photon pairs.

The embodiments of source 210 illustrated in FIGS. 2A, 2B, and 2C are merely examples of suitable sources of entangled photons. Other types of sources of entangled photons could alternatively be used. For example, a Bell state analyzer such as described in Barrett et al., "A Symmetry Analyser For Non-Destructive Bell State Detection Using EIT," quant-ph/0408117 can produce an entangled state (e.g., a Bell state) of two photons from an unentangled pair of photons.

State selector 230 receives the entangled photon pair and outputs the desired photon state. More specifically, if source 210 produces a photon pair that is not in the desired state, e.g., not the singlet Bell state $|\phi\rangle$, state selector 230 can be adjusted to convert or alter the polarizations of photons from source 210 to produce the desired state. In the exemplary embodiment, the photon pair from source 210 is in the singlet Bell state $|\phi\rangle$ of Equation 1, where qubit basis states $|0\rangle_i$ and $|1\rangle_i$ correspond to orthogonal linear polarization states $|H\rangle_i$ and $|V\rangle_i$ of the photon associated with qubit i. Accordingly, state selector 230 is not necessary except to correct errors in state preparation and/or to separate the photons.

State selector 230 of FIGS. 2A and 2B includes two half-wave plates 231 and 232 in channel A and one half-wave plate 233 in channel B having adjustable orientations. In one embodiment, half-wave plates 231, 232, and 233 are conventional optical plates of birefringent material having thicknesses selected according to the wavelengths of the photons in the A and B channels. Conventional mounting structures, which hold wave plates 231, 232, and 233 in respective channels A and B, permit adjustment of the orientations of the slow axes of half-wave plates relative to the polarization axes of photons in the A and B channels. Alternatively, half-wave plates 231, 232, and 233 can be adjustable fiber optic components such as those commercially available from Thorlabs, Inc. of Newton, N.J.

One setting of the orientations of half-wave plates 231, 232, and 233 provides no relative change in the polarization or phase of the photons in the channel A and B. In this configuration, source 210 produces a quantum state that is used without change. Alternatively, if source 210 is not producing the desired state, e.g., the singlet Bell state $|\phi\rangle$, the slow axes of half-wave plates 231, 232, and 233 can be adjusted to rotate the polarizations of respective photons and introduce a relative phase shift so that the output state from state selector 230 is in the desired prepared state.

The embodiment of state selector 230 shown in FIG. 2C is adapted for a photon pair from a source 210 producing photons on optical fibers. In FIG. 2C, state selector 230 includes a half-wave plates 231 and 232 in the optical fiber corresponding to channel A and half-wave plate 233 in the optical fiber corresponding to channel B. Half-wave plates 231, 232, and 233, which can be implemented using discrete or fiber optic components, are adjustable to control the relative phase and polarization of the two entangled photons and can thus be used to select a desired entangled state, e.g., the singlet Bell state in a polarization representation.

A tomographic analyzer 240 and a detector assembly 250 operate to measure expectation values of the prepared state to approximately identify the prepared state. If random number generator 200, 200B, or 200C is operating properly, the identified state in the exemplary embodiment of the invention should be the singlet Bell state $|\phi\rangle$, which is repeatedly used for random number generation. Tomographic analysis of quantum states and particularly qubit states is known in the art and described, for example, by James et al., "Measurement of Qubits," Phys. Rev. A, Vol. 64, 052312. Tomography for an n-qubit state generally requires measurement of $(4^n-1)$ different expectation values of the state to determine the density matrix $\rho$ of the state or equivalently the complex coefficients of the state expressed in terms of selected basis states. Accordingly, many copies of the same state are generally required for measurements of the expectation values. The $(4^n-1)$ different expectation values and the normalization requirement for the quantum states ideally produce $4^n$ independent restrictions on $2^n$ complex coefficients of a general n-qubit state, permitting an analytic solution for the density matrix $\rho$ and/or the $2^n$ complex coefficients defining the measured state.

Tomographic analysis for the 2-qubit case illustrated in FIG. 2A, 2B, or 2C requires measurement of 15 independent expectation values. In an exemplary embodiment, the necessary expectation values can be found by measuring expectation values for the four different combinations of horizontal and vertical polarizations of the two photons for up to four different combinations of polarization rotations by tomographic analyzer 140.

In an exemplary embodiment of the invention, tomographic analyzer 140 includes a quarter-wave plate 242, a half-wave plate 243, and a polarizing beam splitter 244 in channel A and a quarter-wave plate 246, a half-wave plate 247, and a polarizing beam splitter 248 in channel B. Wave-plates 242, 243, 246, and 247 can be implemented using conventional discrete elements in adjustable mountings, for example, in random number generators 200 or 200B or as fiber optic components, for example, in random number generator 200C. Polarizing beam splitters 244 and 248 are similarly available as discrete elements or as a fiber optic polarizing components. Typically polarizing beam splitter contains a multi-layer thin film coating or a birefimgent material for separation of orthogonal linear polarization components of an input beam.

Wave-plates 242 and 243 in channel A and wave-plates 246 and 247 in channel B are adjustable and have specific settings that are used for measurements of the expectation values used in tomographic analysis. In general, the settings of wave-plates 242, 243, 246, and 247 will depend on or control the particular expectation values that will be measured, and many different choices of expectation values are possible for tomographic analysis. The following describes a specific embodiment that illustrates one possible set of expectation values that can be used in tomographic analysis of a 2-photon state.

In the illustrative example, wave-plates 242 and 243 have three fixed settings for measurements of the expectation values used in tomographic analysis. A first setting of wave-plates 242 and 243 orients the polarization associated with one of states $|0\rangle_A$ and $|1\rangle_A$ along the polarization direction transmitted through polarizing beam splitter 244 and orients the polarization of the other state $|1\rangle_A$ or $|0\rangle_A$ along the polarization direction reflected in polarizing beam splitter 244. With the first setting, detectors assembly 250 can measure two expectation values, one associated with the horizontal polarization operator $H_A$ for photons in channel A and one associated with the vertical polarization operator $V_A$ for photons in channel A. (The expectation values for horizontal and vertical polarization operators $H_A$ and $V_A$ are generally dependent and provide a check of the operation of the random number generator.

A second setting of wave-plates 242 and 243 rotates the polarization associated with states $|0>_A$ and $|1>_A$ so that the polarization directions of states $|1>_A$ are $|0>_A$ at an angle (e.g., 45°) with the polarization direction reflected in polarizing beam splitter 244. With the second setting, detectors assembly 250 can measure the expectation value of the operator $H_A+V_A$ or the operator $H_A-V_A$. A third setting of wave-plates 242 and 243 rotates the polarization associated with states $|0>_A$ and $|1>_A$ by an angle (e.g., 45°) and introduces a relative phase shift (e.g., of a phase angle n) between the horizontally and vertically polarized states. With the third setting, detector assembly 250 can measure a fourth independent expectation value, which is the expectation value associated with the operator $H_A+iV_A$ or the operator $H_A-iV_A$.

Wave plates 246 and 247 similarly have three settings. For example, a first setting can be such that the polarizations of states $|0>_B$ and $|1>_B$ are along or perpendicular to the polarization axes of beam splitter 248. The second setting can be such that the polarizations of states $|0>_B$ and $|1>_B$ are at 45° to the polarization axes of beam splitter 248, and the third setting can be such that the polarizations of states $|0>_B$ and $|1>_B$ are at 45° and have an additional relative phase factor i.

Tomographic analyzer 240 has four output channels AH, AV, BH, and BV from polarizing beam splitters 244 and 248. Detector assembly 250 includes four detector systems 252, 254, 256, and 258 that can detect single photons in respective output channels AH, AV, BH, and BV. Any suitable single photon detectors 252, 254, 256, and 258 can be employed in detector assembly 250. In particular, each detector 252, 254, 256, or 258 may include a photodiode that is sensitive to the photons of the frequencies used in respective channels A and B. For an embodiment of the invention employing fiber optic light paths, a fiber-coupled version of a detector for 1550-nm light can be purchased commercially from id Quantique SA of Geneva, Switzerland.

Detectors 252, 254, 256, and 258 can be used with different combinations of the settings of wave plates 242, 243, 246, and 247 to measure the independent expectation values required for tomographic analysis. In particular, the fixed settings of wave plates 242, 243, 246, and 247 have nine different combinations each of which permits measurements of up to two independent expectation values. A set of 15 independent expectation values can be selected from the 18 measurements. As is known in the art, selection of a particular set of expectation values for tomographic analysis can be done in different manners, and the particular set selected will control the analytic formula or methods used for determining the density matrix ρ of the measured 2-qubit state.

A measurement from detector system 250 can also be used to generate a random bit. For example, a bit value 0 may be output upon detection of a photon with horizontal polarization in the B, and a bit value 1 may be output upon detection of a photon with vertical polarization in the B channel. An advantage of an exemplary embodiment of the invention that uses the 2-qubit singlet Bell state in a polarization representation and an analyzer 240 with the settings described above does not change the statistics of random series. In particular, the photon in channel A or B has a 50% probability of having the horizontal or vertical polarization, whether or not analyzer 240 rotates the polarization of the A or B channel photon. Accordingly, random bits having values determined based on detection of horizontal or vertical polarizations of photons can be used in the random series at the same time that expectation values are being measured to authenticate the random series. Real time authentication of the random series can thus be provided. Similar combinations of measurements that are suitable for both tomographic analysis and random number generation can similarly be found for other maximally entangled states.

In accordance with a further aspect of the invention, the bit rate for a random series can be increased by determining two random bits from measurements of the 2-qubit state. Two random bits can only be generated when the settings of tomographic analyzer 240 is such that measurement one photon does not determine the result from measuring the other photon. For example, when tomographic analyzer 240 receives the singlet Bell state of Equation 1 and is set to transmit the photon in channel A with no polarization change and to rotate the polarization of the photon in channel B by 45°, a detection of a photon with horizontal (vertical) polarization in the A channel dictates that the polarization of the photon in the B channel be vertical (horizontal) before polarization rotation in tomographic analyzer 240. With polarization rotation of the B channel photon in tomographic analyzer 240, the photon in channel B is at 45° to the polarization reflected by PBS 248, resulting in a 50% probability for either detector 256 or 258 to detect the photon in channel B. Accordingly, when the setting of tomographic analyzer 240 provides a relative rotation of the polarizations of the photons in channels A and B, a first random bit can be generated according to whether detector 252 or 254 detects the photon in channel A, and a second random bit can be generated according to whether detector 256 or 258 detects the photon in channel B.

Measurements of photons in detector 250 can be conducted on a coincidence basis. With a coincident detection requirement, a random bit is only used if detection of a photon in one of the A-channel detectors 252 and 254 is nearly coincident with detection of a photon in one of the B-channel detectors 256 and 258. In one mode of operation, quantum random number generator 200 uses both photon measurements with or without tomographic analysis. For example, a measurement result for channel A provides a bit having a random value 0 or 1 selected according to whether detector 252 or 254 detects a photon. The probability of a specific output bit 0 or 1 will be 50% if state selector 230 outputs the singlet Bell state $|\phi>$ given by Equation 1 and an orthogonal basis (e.g., states $|H>_i$ and $|V>_i$ correspond to qubit states $|0>_i$ and $|1>_i$) is used. A measurement result for channel B allows confirmation that the desired state $|\phi>$ was created and used. For example, with the singlet Bell state $|\phi>$ of Equation 1, the measurement result for channel A should be anticorrelated with the measurement result for channel B. However, anticorrelation is insufficient for the conclusion that prepared state had the desired form $|\phi>$ since any state with a density matrix $\rho_\theta$ with the form given in Equation 2 should give perfectly anticorrelated measurements.

$$\rho_\theta = \cos^2\theta\{|01>-|10>\}\{<01|-<10|\}+\sin^2\theta\{|01>\}\{<01|+<10|\} \quad \text{Equation 2}$$

In accordance with an aspect of the invention described above, detector assembly 250 can be used to reconstruct the density matrix ρ of state $|\phi>$ using tomographic analysis. However, tomographic analysis and state reconstruction techniques may not be necessary when simpler confirmation or authentication techniques are sufficient. A simple example described above uses a singlet Bell state and detection of anticorrelation to authenticate that the correct state was generated. Another technique evaluates the Bell inequality for the measured state to detect whether the state was maximally entangled, as should be the case for the singlet Bell state. Alternatively, repeated measurements during creation of the random series can determine expectation values for calculation of the entanglement of formation (EOF) and/or the entropy (S) or to reconstruct the measured state as confirmation that the expected state |ϕ> was used for generation of the random series.

System 200 has the advantage of being able to check the properties of the random series on the fly. If, for example, a maximally entangled Bell state is produced, the measurement of the state is known to provide a random bit with equal probability of being a 0 or 1. Alternatively, auxiliary measurements that are not used for random number generation can be used for authentication that the measured state is the correct state to provide the random series having the desired statistical properties. In particular, a random number generator can perform auxiliary measurements to authenticate that the measured quantum state is correct and then switch to measurements for random series generation. The random number generator can occasionally or periodically return to performing auxiliary measurements to confirm that the system is continuing to work properly.

In accordance with another aspect of the invention, random number generator 200 can be used in three different modes. In a first mode, an output bit is only used in the random sequence if photons are detected in both channels A and B and both measurements confirm that the measured state has the desired form. This mode has the advantage of high degree of confidence that the desired state was produced and hence confidence that the random series has the desired statistical properties. However, detector inefficiencies will generally cause this mode to produce a lower bit rate.

A second operating mode of random number generator 200 generates a random bit if one of two measurement results occurs. If a photon in only one channel is detected, the random bit corresponding to the measured photon is output, and failure to detect the photon in the other channel is assumed to arise from inefficiency in detector assembly 250 or elsewhere in generator 200. If the both photons are detected, a random bit is used if the measurement of the other detected photon confirms that the state |ϕ> had the desired form. Further, the measurement may be used in tomographic or other analysis providing further confirmation that the state had the desired form. This mode increases the bit rate of the output random sequence at the risk of failing to detect manipulation of source 210.

The third operating mode of random number generator 200 uses the purification/distillation properties of linear optics to ensure use of the desired maximally entangled state |ϕ> for random number generation. In general, operational errors or inefficiency may produce an output state from state selector 230 or source 210 that is not a perfect maximally entangled Bell state. Linear optical filtering can purify the desired state used for random number generation at the expense of destroying some photon pairs. R. T. Thew and W. J. Munro, "Mixed state entanglement: Manipulating polarization-entangled photons," Phys. Rev. A, Vol. 64, 022320 describes some techniques for improving the purity of entangled states.

Figure 3:
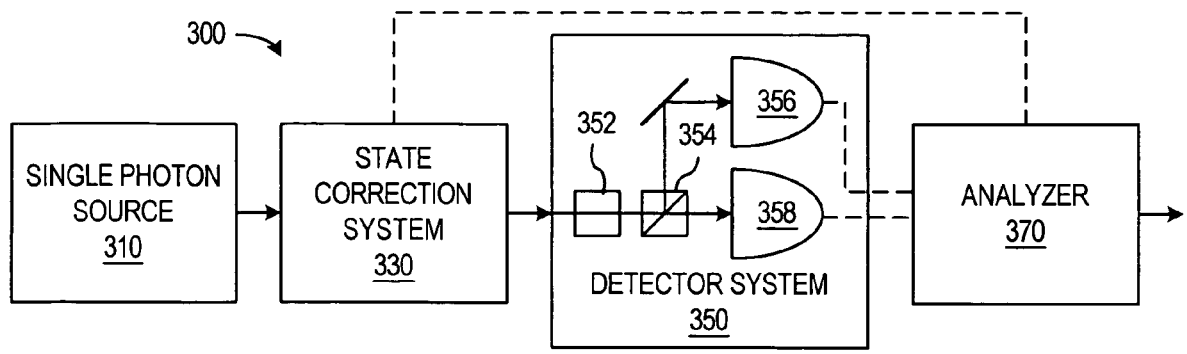
FIG. 3 shows a random number generator in accordance with an embodiment of the invention performing tomographic analysis of a single-photon state.

The tomographic analysis described above can be employed to authenticate that any desired quantum state is being consistently and correctly generated. More specifically, tomographic analysis is not limited to self-authenticating quantum random number generators using just the singlet Bell state, just an entangled state, or only the states of a photon pair. Tomographic analysis can authenticate a random series generated from any state representing one or more qubits. FIG. 3, for example, illustrates a random number generator 300 in accordance with an embodiment of the invention using tomographic analysis of a single photon state.

Random number generator 300 includes a source 310 single photons in a desired state, state correction optics 330, a tomographic detector system 350, and an analyzer 370. In operation, source 310 periodically produces a single photon that is in a desired state for use in generating a random series. As an example, the desired state |ϕ'> can correspond to a photon with a specific polarization state that is a known linear combination of horizontal and vertical polarization states as shown in Equation 3. In Equation 3, the coefficients $c_0$ and $c_1$ control the probability amplitudes for finding the photon respectively with horizontal or vertical polarization and therefore control the statistics of the generated random series.

$$|\phi'> = c_0|0> + c_1|1> = c_0|H> + c_1|V>$$ Equation 3

State correction system 330 is under control of analyzer 370 and may be used to correct errors in the preparation of the desired state. In particular, analyzer 370 can operate state correction system 330 to ensure the photon state input to tomographic detector system 350 has the form of Equation 3 and the proper values for coefficients $c_0$ and $c_1$.

Tomographic detector system 350 can be used to measure the single-photon state. In the illustrated embodiment, detector system 350 includes polarization rotating optics 352, a polarizing beam splitter 354, and single photon detectors 356 and 358 in respective output channels of polarizing beam splitter 354. In one measurement mode, optics 352 transmits the single photon state unaltered and one of photon detectors 356 and 358 detects the photon. Analyzer 370 then generates a random bit having one value (e.g., 0) if detector 356 detects the photon and another value (e.g., 1) if detector 358 detects the photon. As a series of random bits are generated, analyzer 370 can record the number of photons each detector 356 and 358 detects for use in determining of two of the expectation values required for tomographic analysis.

In a second mode of operation, polarization rotating optics 352 transforms the polarization of the input state (e.g., rotates the polarization by 45° with or without a relative phase shift factor i). In the general case, the transformations will change the probability of detector 356 or 358 detecting a photon, and therefore the second mode is not used for generation of values in the random series. However, analyzer 370 can record the numbers of photons detected by detector 356 or 358 and determine additional expectation values for tomographic analysis. If a tomographic analysis indicates that the single photon state being repeated generated is not the desired state, analyzer 370 can control correction optics 330 so that the state output from correction optics 330 is the desired state.

Figure 4:
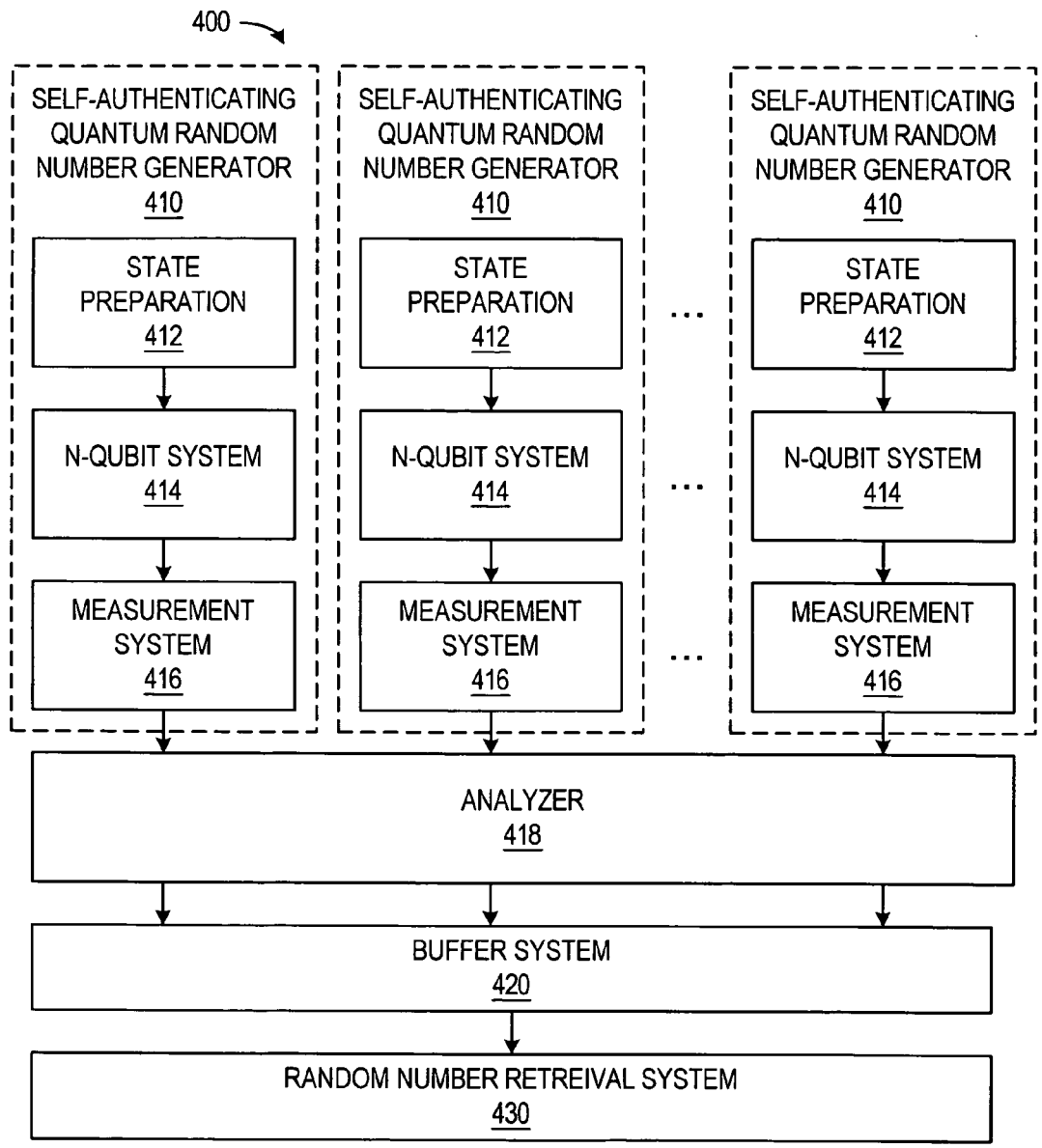
FIG. 4 shows a random number generator in accordance with an embodiment of the invention using a buffer to store random values for subsequent use.

FIG. 4 shows an embodiment of a random number generator 400 using one or more self-authenticating random number generators 410 with a buffer system 420 and a random number retrieval system 430. Each random number generator 410 includes an N-qubit system 414 with an associated state preparation system 412. N-qubit system 414 is a quantum system such as one or more photon channels or solid-state systems capable of representing N qubits, where N is greater than or equal to one. State preparation system 412 is a corresponding structure for preparing a desired quantum state of the corresponding N-qubit system 414.

Each random number generator 410 further contains a measurement system 416 that measures the corresponding N-qubit system 414. In an exemplary embodiment, measurement system 416 includes a tomographic analyzer and a set of detectors for evaluating the expectation values required for random number generation and tomographic analysis. As state above, the desired state can be any state of one or more qubits. However, an advantage of using an entangled multi-qubit state (e.g., two or more qubits) for random number generation instead of a single qubit state as in random number generator 300 is that authentication information can be found without performing a full tomographic analysis. As described above, with the entanglement, a measurement of the entangled photons can be immediately identified as being consistent or inconsistent with the known entangled state. However, tomographic analysis can be performed for a higher level of authentication.

Analyzer 418 receives measurement signals from the measurement systems 416 of the random number generators 410 and both determines random values and authenticates that the random values were generated from the correct quantum state. Analyzers 418 can be implemented electronically as hardwired logic or a computing system executing software that performs the analysis of the output of measurement systems 416. In alternative embodiments, analyzer 418 could include multiple parallel systems, each of which processes signals from a corresponding one of measurement systems 416, or analyzer 418 could be single computing system that processes the signals from all of the measurement systems 416.

Each random number generator 410 outputs a random series of bits that analyzer 418 can stored in buffer system 420. Buffer system 420 can be a digital storage device of any desired type including but not limited to a FIFO buffer, a random access memory, or a hard drive.

Random number retrieval system 430 provides an interface for retrieval of random numbers for use in client devices (not shown). The client devices may be, for example, one or more computers running processes that require random numbers for execution. The properties and implementation of retrieval system 430 will generally depend on the characteristics of buffer system 420 and the client devices, but such interface are well known for conventional computer systems and networks.

Although the invention has been described with reference to particular embodiments, the description is only an example of the invention's application and should not be taken as a limitation. For example, although the described embodiments employing photons as systems representing entangled qubits use a polarization basis, other physical systems or qubit representations may also be suitable for use in certain embodiments of the invention. For example, path encoding, number encoding, or time bin encoding of photon states can represent entangled qubits. Various other adaptations and combinations of features of the embodiments disclosed are within the scope of the invention as defined by the following claims.

What is claimed is:

1. A method for generating a random series, comprising:
   generating an entangled quantum state of a first system and a second system;
   measuring the first system and the second system;
   determining a random value from a result of measurement of one of the first system and the second system; and
   evaluating results from measurements of both of the first system and the second system to determine whether the results are consistent with the first and second systems being in the entangled state.

2. The method of claim 1, wherein generating the entangled state comprises generating a pair of photons in the entangled state.

3. The method of claim 1, wherein measuring the first and second system comprises performing tomographic analysis to identify the entangled state.

4. The method of claim 1, wherein the entangled state is a singlet Bell state.

5. The method of claim 1, further comprising using the random value in generation of the random series only if the results from the measurements are consistent with the first system and the second system being in the entangled state.

6. The method of claim 1, further comprising not using the random value in generation of the random series whenever the results from the measurements are not consistent with the first system and the second system being in the entangled state.

7. The method of claim 1, further comprising:
   repeating the steps of generating the entangled quantum state, measuring, and determining a random value a result of the measurement of one of the first and second systems;
   storing each of the random values in a buffer to create a random series; and
   accessing the buffer to extract a random number from the random series.

8. A method for generating a random series, comprising:
   generating an entangled state of a first photon and a second photon;
   measuring the first photon and the second photon;
   determining a random value from a result of measurement of one of the first photon and the second photon; and
   evaluating results from measurements of both of the first photon and the second photon to determine whether the results are consistent with the first photon and the second photon being in the entangled state.

9. The method of claim 8, further comprising using the random value in generation of the random series only if the results from the measurements are consistent with the first photon and the second photon being in the entangled state.

10. The method of claim 8, further comprising not using the random value in generation of the random series whenever the results from the measurements are not consistent with the first photon and the second photon being in the entangled state.

11. The method of claim 8, further comprising using the random value in generation of the random series only if the measurements detect only one of the first and second photons or the results from the measurements are consistent with the first photon and the second photon being in the entangled state.

12. The method of claim 8, wherein the entangled state corresponds to polarization entangled photons.

13. A method for generating a random series, comprising:
   generating a quantum state of a system;
   measuring the system;
   determining a random value from a result of measurement of the system;
   repeating the steps of generating, measuring, and determining to produce a series of random values; and
   performing tomographic analysis of the quantum state to confirm whether repetitions of generating the quantum state generated a desired quantum state.

14. The method of claim 13, wherein the desired quantum state represents a single qubit.

15. The method of claim 13, wherein the desired quantum state represents multiple qubits.

16. The method of claim 13, wherein the desired quantum state represents entangled qubits.

17. The method of claim 13, wherein the system comprises a photon.

18. The method of claim 13, further comprising performing auxiliary measurements of the system, wherein each auxiliary measurements is not used to determine a random value and is used in performing the tomographic analysis.

19. The method of claim 13, further comprising:
storing the series of random values in a buffer; and
accessing the buffer to extract a random number from the series of random values.

20. A system for generating a random series, comprising:
a source capable of creating an entangled quantum state of a first system and a second system;
a detector operable to measure the first system and the second system; and
an analyzer that uses results from measurements of the first system and the second system in selecting whether to use in the random series a random value indicated by a result from a measurement of at least one of the first system and the second system.

21. The system of claim 20, wherein each of the first system and the second system comprises a photon, and the entangled state comprises a state of a pair of photons.

22. The system of claim 21, wherein polarizations states of the two photons are entangled.

23. The system of claim 20, wherein the source comprises:
a source of a pair of photons; and
a state selector that processes the pair of photons such that the photons output from the state selector are in the entangled quantum state.

24. The system of claim 23, wherein the detector comprises a tomographic analyzer.

25. The detector of claim 20, wherein the entangled state is a singlet Bell state.

26. The system of claim 20, wherein the source comprises a semiconductor device containing a quantum dot.

27. The system of claim 20, wherein the source comprises:
a photon source; and
a parametric down conversion crystal.

28. The system of claim 20, wherein the source comprises:
a fiber optic loop; and
a beam splitter in the fiber optic loop, the beam splitter providing an input path and an output path for photons in the fiber optic loop.

29. The system of claim 20, further comprising:
a second source capable of creating an entangled quantum state of a third system and a fourth system;
a second detector operable to measure the third system and the fourth system, wherein the analyzer uses results from measurements of the third system and the fourth system in selecting whether to use in the random series a random value indicated by a result from a measurement of at least one of the third system and the fourth system; and
a buffer for storage of the random series including the random values that the analyzer selected.

30. A system for generating a random series, comprising:
a source capable of repeatedly creating a quantum state of a system;
a first detector operable to measure the system, wherein a measurement result from the first detector provides a random value for the series; and
a tomographic analyzer that uses measurement results from the first detector to determine whether the quantum state created by the source is a desired state.

31. The system of claim 30, wherein the desired quantum state represents a single qubit.

32. The system of claim 31, wherein the desired quantum state represents multiple qubits.

33. The system of claim 31, wherein the desired quantum state represents entangled qubits.

34. The system of claim 31, wherein the system comprises a photon.

35. The system of claim 31, wherein when determining whether the quantum state created by the source is the desired state, the tomographic analyzer uses measurements of the system that are used to determine the random values of the random series and measurements of the system that are not used to determine the random values of the random series.

36. The system of claim 30, further comprising:
a second source capable of repeatedly creating a quantum state of a second system;
a second detector operable to measure the second system, wherein a measurement result from the second detector provides a random value for the series;
a second tomographic analyzer uses measurement results from the second detector to determine whether the quantum state of the second system is a desired state; and
a buffer for storage of the random series including the random values provided by the measurement results from the first detector and the second detector.

* * * * *

UNITED STATES PATENT AND TRADEMARK OFFICE
CERTIFICATE OF CORRECTION

PATENT NO. : 7,428,562 B2
APPLICATION NO. : 10/998208
DATED : September 23, 2008
INVENTOR(S) : Raymond G. Beausoleil et al.

It is certified that error appears in the above-identified patent and that said Letters Patent is hereby corrected as shown below:

In column 5, line 2, after "frequency" delete "o" and insert -- $\omega$ --, therefor.

In column 8, lines 56-57, delete "$\rho_\theta = \cos^2\theta\{|01\rangle - |10\rangle\}\{\langle 01| - \langle 10|\} + \sin^2\theta\{|01\rangle\}\{\langle 01| + \langle 10|\}|$" and insert -- $\rho_\theta = \cos^2\theta\{|01\rangle - |10\rangle\}\{\langle 01| - \langle 10|\} + \sin^2\theta\{|01\rangle + |10\rangle\}\{\langle 01| + \langle 10|\}|$ --, therefor.

Signed and Sealed this

Fourteenth Day of July, 2009

JOHN DOLL
*Acting Director of the United States Patent and Trademark Office*